United States Patent
LaRose, Jr. et al.

(10) Patent No.: US 9,371,763 B2
(45) Date of Patent: Jun. 21, 2016

(54) METHOD OF OPERATING AN EXHAUST GAS TREATMENT SYSTEM TO PREVENT QUENCHING DURING REGENERATION

(75) Inventors: Thomas LaRose, Jr., Redford, MI (US); David Michael VanBuren, Livonia, MI (US); Patrick Barasa, An Arbor, MI (US); Michael V. Taylor, Wolverine Lake, MI (US); Kari Jackson, Redford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1386 days.

(21) Appl. No.: 13/052,341

(22) Filed: Mar. 21, 2011

(65) Prior Publication Data
US 2012/0240552 A1 Sep. 27, 2012

(51) Int. Cl.
*F01N 3/00* (2006.01)
*F01N 3/20* (2006.01)
*F02D 41/02* (2006.01)
*F02D 41/40* (2006.01)
*F01N 3/025* (2006.01)
*F02D 41/14* (2006.01)

(52) U.S. Cl.
CPC ............ *F01N 3/2066* (2013.01); *F01N 3/0253* (2013.01); *F01N 3/2033* (2013.01); *F02D 41/025* (2013.01); *F02D 41/029* (2013.01); *F02D 41/402* (2013.01); *F01N 2430/085* (2013.01); *F01N 2560/06* (2013.01); *F01N 2560/14* (2013.01); *F01N 2610/03* (2013.01); *F01N 2900/1602* (2013.01); *F01N 2900/1621* (2013.01); *F01N 2900/1626* (2013.01); *F02D 41/1441* (2013.01); *F02D 41/1446* (2013.01); *Y02T 10/24* (2013.01); *Y02T 10/26* (2013.01); *Y02T 10/44* (2013.01)

(58) Field of Classification Search
CPC ... F01N 3/0253; F01N 3/2033; F01N 3/2066; F02D 41/025; F02D 41/029; F02D 41/402
USPC .................................. 60/274, 277, 286, 295
See application file for complete search history.

(56) References Cited

U.S. PATENT DOCUMENTS

| | | | | |
|---|---|---|---|---|
| 5,787,705 | A * | 8/1998 | Thoreson | 60/274 |
| 6,622,480 | B2 * | 9/2003 | Tashiro et al. | 60/295 |
| 6,823,663 | B2 * | 11/2004 | Hammerle et al. | 60/286 |
| 7,021,278 | B2 * | 4/2006 | Ishizuka et al. | 123/299 |
| 7,861,516 | B2 * | 1/2011 | Allansson et al. | 60/286 |
| 8,555,619 | B2 * | 10/2013 | Park | 60/295 |
| 2003/0212484 | A1 * | 11/2003 | Takebayashi et al. | 701/114 |
| 2003/0230076 | A1 * | 12/2003 | Kwon | 60/295 |
| 2004/0083722 | A1 * | 5/2004 | Simpson et al. | 60/286 |

(Continued)

FOREIGN PATENT DOCUMENTS

| | | |
|---|---|---|
| CN | 2573712 Y | 9/2003 |
| GB | 1520372 A | 8/1978 |
| JP | 2009138531 A | 6/2009 |

*Primary Examiner* — Thomas Denion
*Assistant Examiner* — Matthew T Largi
(74) *Attorney, Agent, or Firm* — Quinn Law Group, PLLC

(57) ABSTRACT

A method of controlling an exhaust gas treatment system of a vehicle includes detecting a request to regenerate a particulate filter, and injecting hydrocarbons at an injection rate into a flow of exhaust gas upstream of an oxidation catalyst to heat the oxidation catalyst. The injection rate is increased at a current acceleration rate, and the current acceleration rate is reduced to define a reduced acceleration rate when the oxidation catalyst is quenched.

19 Claims, 3 Drawing Sheets

(56) References Cited

U.S. PATENT DOCUMENTS

| | | | |
|---|---|---|---|
| 2005/0022517 A1* | 2/2005 | Miura | 60/295 |
| 2005/0198942 A1* | 9/2005 | van Nieuwstadt et al. | 60/284 |
| 2009/0158707 A1* | 6/2009 | Baird et al. | 60/274 |
| 2009/0292446 A1* | 11/2009 | Tanaka | 701/103 |
| 2010/0132334 A1* | 6/2010 | Duclos et al. | 60/286 |
| 2013/0283767 A1* | 10/2013 | Jackson et al. | 60/274 |

* cited by examiner

METHOD OF OPERATING AN EXHAUST GAS TREATMENT SYSTEM TO PREVENT QUENCHING DURING REGENERATION

TECHNICAL FIELD

The invention generally relates to a method of operating a vehicle, and more specifically to a method of controlling an exhaust gas treatment system of the vehicle.

BACKGROUND

Exhaust gas treatment systems for internal combustion engines, including but not limited to diesel engines, may include an oxidation catalyst, often referred to as a diesel oxidation catalyst when coupled to a diesel engine, for treating a flow of exhaust gas from the engine. The oxidation catalyst is a flow through device that consists of a canister containing a substrate or honeycomb-like structure. The substrate has a large surface area that is coated with an active catalyst layer. As the exhaust gases traverse the active catalyst layer, carbon monoxide, gaseous hydrocarbons and liquid hydrocarbon particles, i.e., unburned fuel and/or oil, are oxidized, thereby reducing harmful emissions.

However, in order for the active catalyst layer to oxidize the carbon monoxide, gaseous hydrocarbons and liquid hydrocarbon particles, the active catalyst layer must be at or above a light-off temperature. Often, once the active catalyst layer reaches the light-off temperature, additional hydrocarbons are injected into the flow of exhaust gas through either late post fuel injection or a hydrocarbon injector. The additional hydrocarbons injected into the flow of exhaust gas may be ignited to further heat the flow of exhaust gas. The injection rate of the hydrocarbons may be increased at an acceleration rate, i.e., ramped up over time. The hydrocarbon injection rate is ramped up, i.e., accelerated, as quickly as the system allows to minimize regeneration time.

The performance of the oxidation catalyst degrades over time with usage of the vehicle due to the loss of the active catalyst material and/or sintering caused by high exhaust gas temperatures. This degradation may cause an increase in the light-off temperature, which may lead to quenching of the oxidation catalyst. Quenching of the oxidation catalyst is defined as the cessation of hydrocarbon oxidation that occurs when the temperature of the active catalyst layer decreases below the light-off temperature. Quenching of the oxidation catalyst may cause excessive hydrocarbons to slip past the oxidation catalyst, thereby reducing the performance of the exhaust gas treatment system, or may result in collection of hydrocarbons on the substrate of the oxidation catalyst, which may lead to excessive temperatures once the light-off temperature is reached and the collected hydrocarbons begin to oxidize.

SUMMARY

A method of controlling an exhaust gas treatment system for a vehicle is provided. The method includes injecting hydrocarbons at an injection rate into a flow of exhaust gas upstream of an oxidation catalyst to heat the oxidation catalyst. The injection rate is increased at a current acceleration rate. A status of the oxidation catalyst is sensed to determine if the oxidation catalyst is quenched or is not quenched. The current acceleration rate is reduced to define a reduced acceleration rate when the status of the oxidation catalyst is determined to be quenched.

A method of operating a vehicle having an exhaust gas treatment system is also provided. The method includes detecting a request to regenerate a particulate filter. A current acceleration rate of hydrocarbon injection is defined. Hydrocarbons are injected at an injection rate into a flow of exhaust gas upstream of an oxidation catalyst to heat the oxidation catalyst. The injection rate is increased at a current acceleration rate. A status of the oxidation catalyst is sensed to determine if the oxidation catalyst is quenched or is not quenched, and the injection of hydrocarbons is stopped when the status of the oxidation catalyst is determined to be quenched. The method further includes comparing the current acceleration rate of hydrocarbon injection to a minimum allowable acceleration rate to determine if the current acceleration rate is greater than or equal to the minimum allowable acceleration rate. A number of occurrences in which the status of the oxidation catalyst is determined to be quenched and hydrocarbon injection is stopped is tracked. The number of occurrences in which the status of the oxidation catalyst is determined to be quenched and hydrocarbon injection is stopped is compared to a pre-defined limit to determine if the number of occurrences is less than or equal to the pre-defined limit. The current acceleration rate is reduced to define a reduced acceleration rate when the status of the oxidation catalyst is determined to be quenched, the number of occurrences is determined to be less than the pre-defined limit, and the current acceleration rate is determined to be greater than the minimum allowable acceleration rate.

Accordingly, the acceleration rate at which the hydrocarbons are injected into the exhaust gas is reduced when the oxidation catalyst is quenched. It has been discovered that reducing the acceleration rate at which the hydrocarbons are introduced into the exhaust gas may prevent quenching of heavily used oxidation catalysts that are less than one hundred percent functional. By preventing quenching of the oxidation catalyst, excessive hydrocarbons that would otherwise slip past the oxidation catalyst when the oxidation catalyst is quenched may be minimized, thereby increasing the useful life of the oxidation catalyst and/or other components of the exhaust gas treatment system by minimizing extreme temperature gradients caused by the hydrocarbons that would otherwise slip past the oxidation catalyst.

The above features and advantages and other features and advantages of the present invention are readily apparent from the following detailed description of the best modes for carrying out the invention when taken in connection with the accompanying drawings.

DETAILED DESCRIPTION

Figure 1:
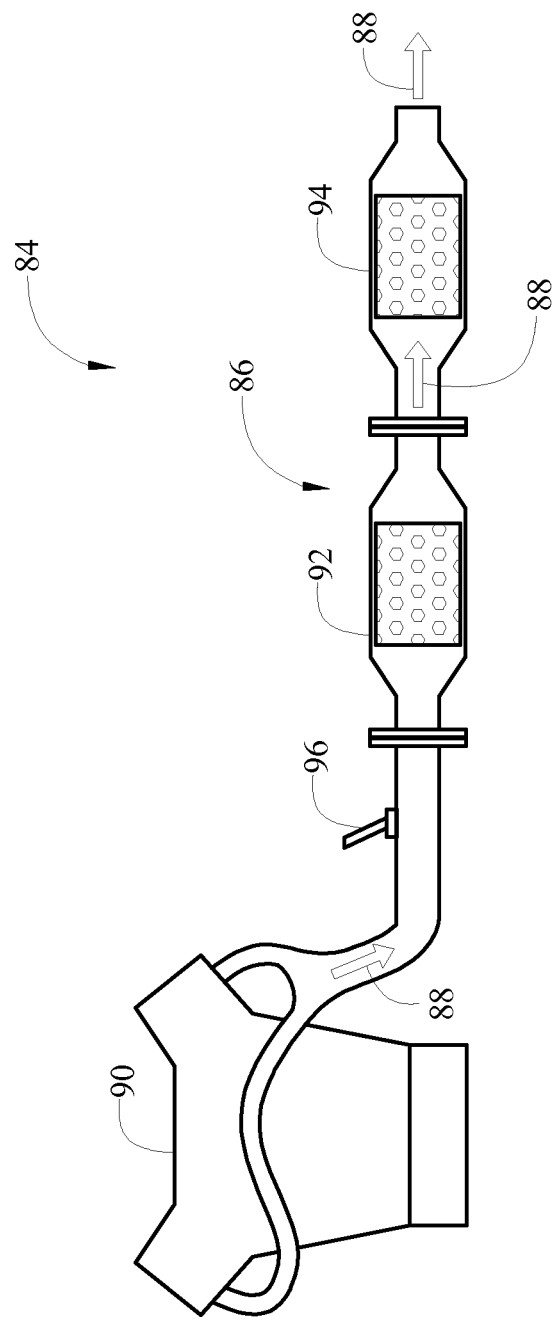
FIG. 1 is a schematic plan view of a vehicle showing an engine and an exhaust gas treatment system for treating exhaust gas from the engine

Referring to FIG. 1, a method of operating a vehicle 84 includes controlling an exhaust gas treatment system 86 for treating exhaust gas, generally indicated by flow arrows 88, from an engine 90 of the vehicle 84. The engine 90 may include but is not limited to a diesel engine. The method may be embodied as one or more algorithms operable on one or more controllers of the vehicle 84.

The exhaust gas treatment system 86 includes an oxidation catalyst 92. If the engine 90 includes a diesel engine, then the oxidation catalyst 92 may be referred to as a diesel oxidation catalyst. The oxidation catalyst 92 is a flow through device that consists of a canister containing a substrate or honeycomb-like structure. The substrate has a large surface area that is coated with an active catalyst layer. The oxidation catalyst 92 treats the flow of exhaust gas from the engine 90 to reduce the toxicity of the exhaust gas, i.e., to reduce toxic emissions of the exhaust gas, including but not limited to, nitrogen oxides (NO), carbon monoxide (CO) and/or hydrocarbons (HC). As the exhaust gases traverse the active catalyst layer, carbon monoxide, gaseous hydrocarbons and liquid hydrocarbon particles, i.e., unburned fuel and/or oil, are oxidized, thereby reducing harmful emissions. The active catalyst material may include Platinum Group Metals (PGM), and convert a percentage of the nitrogen oxides in the exhaust gas into nitrogen and carbon dioxide or water, as well as oxidizes a percentage of the carbon monoxide to carbon dioxide and oxidizes a percentage of the unburnt hydrocarbons to carbon dioxide and water.

The active catalyst layer must be heated to a light-off temperature of the catalyst before the active catalyst layer becomes operational and oxidizes the nitrogen oxides, the carbon monoxide and the unburnt hydrocarbons. Accordingly, the exhaust gas must heat the active catalyst layer to the light-off temperature before the reaction between the active catalyst layer and the exhaust gas begins. In order to rapidly heat the oxidation catalyst 92 and/or other components of the exhaust gas treatment system 86, including but not limited to a diesel particulate filter 94 and/or a selective catalytic reduction unit, hydrocarbons may be injected into the flow of exhaust gas. The hydrocarbons are ignited to generate heat within the exhaust gas, which is transferred to the oxidation catalyst 92 and/or the other components of the exhaust gas treatment system 86. The hydrocarbons may be injected through a late post injection process or through a hydrocarbon injector 96. The hydrocarbons are injected after the oxidation catalyst 92 has reached a burn threshold temperature, which is greater than the light-off temperature, to ensure that the injected hydrocarbons are oxidized across the active catalyst layer.

The performance of the oxidation catalyst 92 degrades or lessens with usage due to loss of catalyst material from the active catalyst layer, and also due to sintering of the substrate. As the oxidation catalyst 92 degrades with usage, the light-off temperature of the oxidation catalyst 92 increases. If the light-off temperature of the oxidation catalyst 92 increases to a temperature above the burn threshold temperature, the hydrocarbons would slip through the oxidation catalyst 92 and/or become trapped on the substrate of the oxidation catalyst 92 without oxidizing. To avoid this situation, the method described herein decreases an acceleration rate of hydrocarbon injection into flow of exhaust gas when the vehicle 84 detects that the oxidation catalyst 92 is quenched. It has been discovered that slowing the acceleration rate of hydrocarbon injection reduces the possibility of the oxidation catalyst 92 from becoming quenched, particularly in oxidation catalysts that are degraded and performing at less than one hundred percent (100%) effectiveness.

Figure 2:
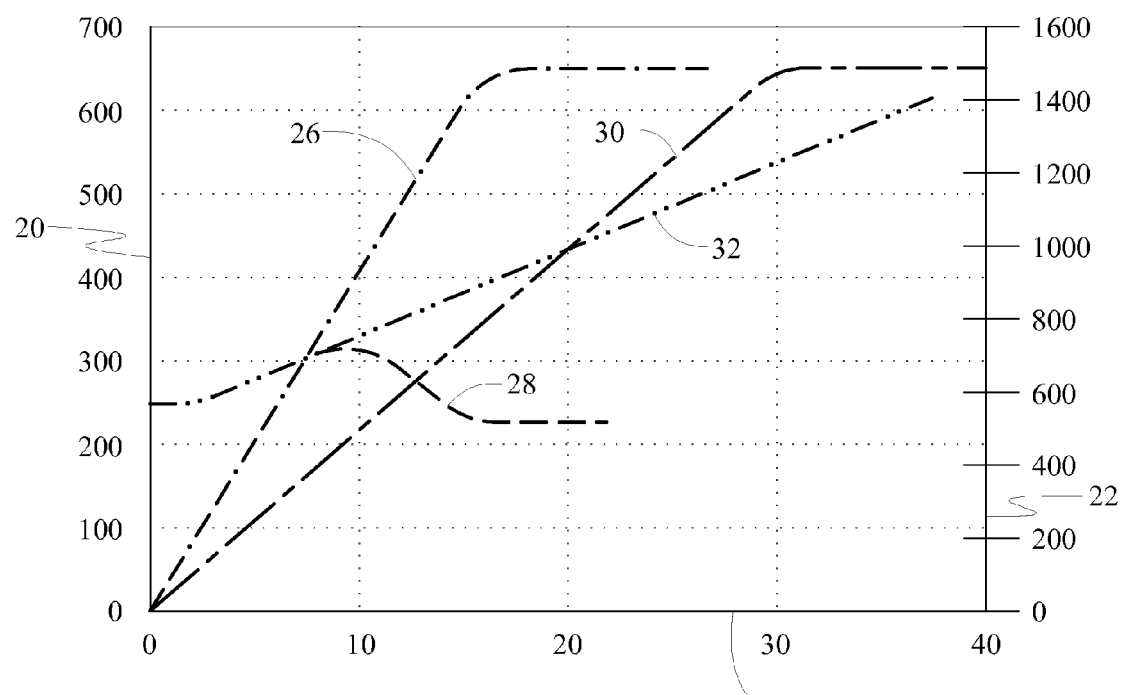
FIG. 2 is a flowchart showing a method of operating the vehicle.

FIG. 2 shows a graph presenting the relationship between injected hydrocarbons and exhaust gas temperatures downstream of an oxidation catalyst 92 at different acceleration rates of hydrocarbon injection. When viewing the graph on the page, the temperature in degrees Celsius (° C.) of the exhaust gas downstream of the oxidation catalyst 92 is shown on a left vertical axis 20, the hydrocarbon injection rate in milligrams per second (mg/s) is shown on a right vertical axis 22, and a time duration in seconds (sec) is shown on a horizontal axis 24. A first line 26 (dash-dash-dot-dash-dash) shows the initial current acceleration rate. If the oxidation catalyst 92 becomes quenched, indicated by a second line 28 (dash-dash), then the temperature of the oxidation catalyst 92 stays the same or falls below over time even though the rate of hydrocarbon injection is increasing. When the oxidation catalyst 92 becomes quenched, then the acceleration rate is reduced, indicated by a third line 30 (long dash-short dash-long dash). It should be appreciated that the slope of the third line 30 is less than the slope of the first line 26, indicating that the change of the injection rate over time is decreased. The decreased acceleration rate of hydrocarbon injection has been found to reduce the possibility of the oxidation catalyst 92 quenching. A non-quenched and properly functioning oxidation catalyst 92 is shown in a fourth line 32 (dash-dot-dot-dash).

Figure 3:
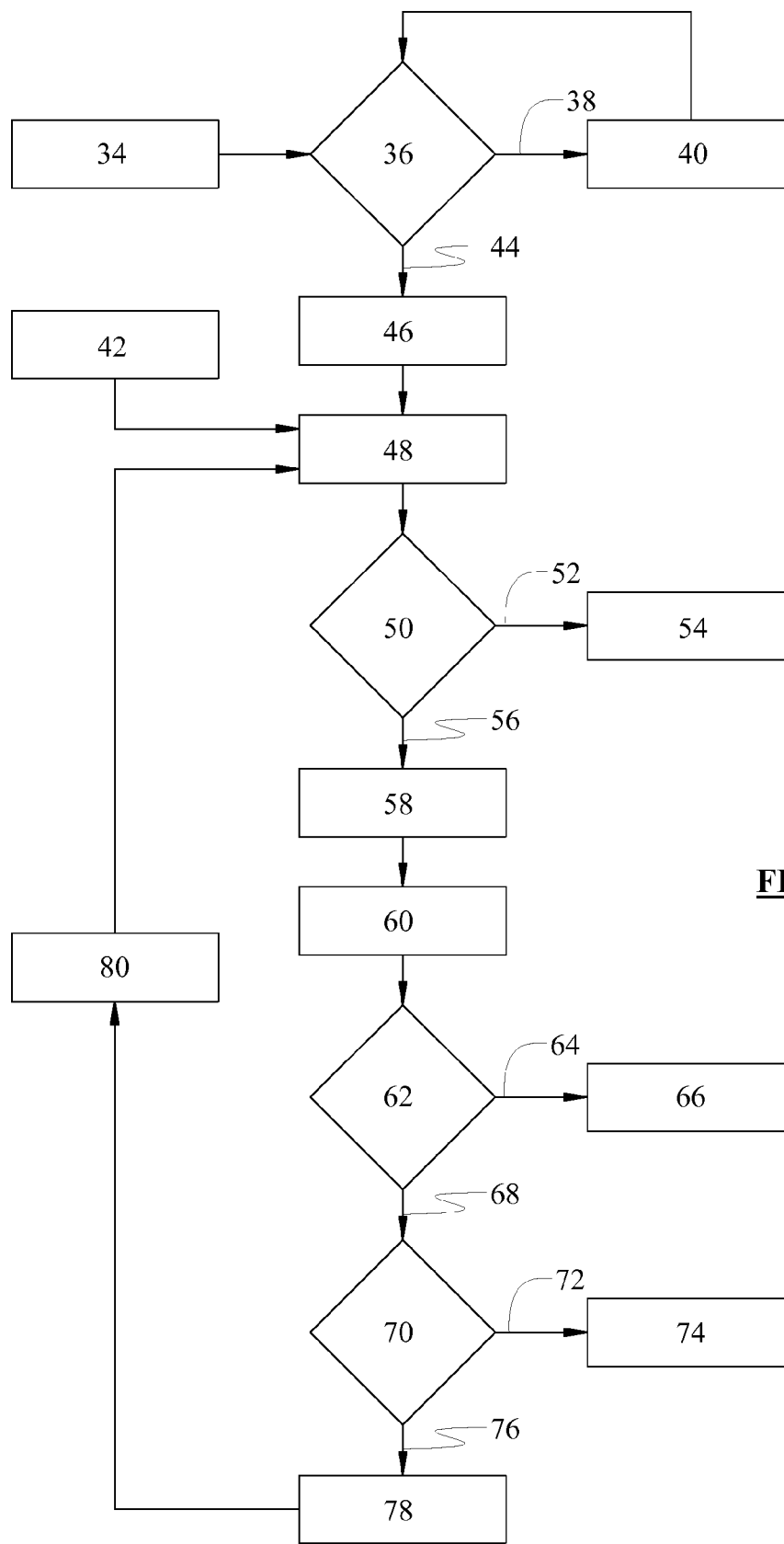
FIG. 3 is a graph showing a relationship between injected hydrocarbons and exhaust gas temperatures downstream of an oxidation catalyst at different acceleration rates of hydrocarbon injection.

Referring to FIG. 3, the method includes detecting a request to regenerate the particulate filter 94, generally indicated by box 34. As is known, the particulate filter 94 must be regenerated periodically to burn off accumulated particulate matter trapped therein. Once the request to regenerate the particulate filter 94 is received, the vehicle 84 determines if the temperature of the active catalyst layer is less than, equal to or greater than the light-off temperature, generally indicated by box 36. If the temperature of the active catalyst layer is below the light-off temperature, generally indicated at 38, then the vehicle 84 controller delays regeneration, generally indicated by box 40, until the temperature of the active catalyst layer is equal to or greater than the light-off temperature so that the active catalyst layer may react with injected hydrocarbons to regenerate the particulate filter 94. The temperature of the active catalyst layer may be determined in any suitable manner, including but not limited to a temperature sensor configured for sensing the temperature of the active catalyst layer, or by relating the temperature of the active catalyst layer from the upstream and downstream temperatures of the exhaust gas.

The method further includes defining a current acceleration rate of hydrocarbon injection, generally indicated by box 42. The current acceleration rate of hydrocarbon injection may include a linear acceleration rate, or a non-linear acceleration rate. In order to regenerate the particulate filter 94, hydrocarbons are injected into the flow of exhaust gas and react with the active catalyst layer in the oxidation catalyst 92. The hydrocarbons are initially injected into the exhaust gas at an initial hydrocarbon injection rate. The initial hydrocarbon injection rate is a measure of the quantity of hydrocarbons injected over a given time. The initial hydrocarbon injection rate is increased over time. Accordingly, the initial hydrocarbon injection rate is accelerated or ramped up over time. The acceleration rate determines how quickly the injection rate changes over time. The acceleration rate is initially set to a current acceleration rate that increases the injection rate as aggressively and/or as quickly as the oxidation catalyst 92 allows when operating at one hundred percent (100%) efficiency to complete the regeneration of the oxidation catalyst 92 as quickly as possible.

Once the active catalyst layer is at or above the light-off temperature, generally indicated at 44, the method includes injecting hydrocarbons, generally indicated by box 46, at the injection rate into the flow of exhaust gas upstream of an oxidation catalyst 92 to heat the oxidation catalyst 92. The injection rate of the hydrocarbons is then increased at a current acceleration rate as described above, generally indicated by box 48.

The method further includes sensing a status of the oxidation catalyst 92 to determine if the oxidation catalyst 92 is quenched or is not quenched, generally indicated by box 50. As used herein, the oxidation catalyst 92 is quenched when the temperature of the exhaust gas downstream of the oxidation catalyst 92 is equal to or less than the temperature of the exhaust gas upstream of the oxidation catalyst 92 as the hydrocarbon injection rate increases. The temperature of the exhaust gas should increase with the increased injection rate of hydrocarbons because the quantity of hydrocarbons in the exhaust gas is continuously increasing. If the temperature of the exhaust gas downstream of the oxidation catalyst 92 is not increasing, i.e., is staying constant or is decreasing, then the increased quantity of hydrocarbons is failing to react with the active catalyst layer, and the oxidation catalyst 92 is quenched. The oxidation catalyst 92 is not quenched when the temperature of the exhaust gas downstream of the oxidation catalyst 92 is increasing relative to the temperature of the exhaust gas upstream of the oxidation catalyst 92, while the injection rate of the hydrocarbons increases. The increasing relative temperature indicates that the increasing quantity of hydrocarbons is reacting with the active catalyst layer in the oxidation catalyst 92.

Accordingly, sensing the status of the oxidation catalyst 92 includes sensing a temperature of the exhaust gas upstream of the oxidation catalyst 92 and downstream of the oxidation catalyst 92, and comparing the sensed downstream temperature of the exhaust gas with the sensed upstream temperature of the exhaust gas as the hydrocarbon injection rate increases to determine if the sensed downstream temperature is less than, equal to or greater than the upstream temperature as the hydrocarbon injection rate increases. It is determined that the oxidation catalyst 92 is not quenched, generally indicated at 52 when the downstream temperature of the exhaust gas is greater than the upstream temperature of the exhaust gas as the hydrocarbon injection rate increases. If the oxidation catalyst 92 is not quenched, then no action is taken, generally indicated by box 54. It is determined that the oxidation catalyst 92 is quenched, generally indicated at 56, when the downstream temperature of the exhaust gas is equal to or less than the upstream temperature of the exhaust gas as the hydrocarbon injection rate increases.

When the status of the oxidation catalyst 92 is determined to be quenched, then the method further includes stopping the injection of hydrocarbons, generally indicated by box 58. Once the vehicle 84 controller determines that the oxidation catalyst 92 is quenched, the injection of hydrocarbons is stopped to prevent excessive hydrocarbons from slipping past the oxidation catalyst 92 and/or accumulating on the substrate of the oxidation catalyst 92 and/or other components of the exhaust gas treatment system 86, such as but not limited to the particulate filter 94 or the selective reduction catalyst. Hydrocarbon injection may be restarted as described above once the vehicle 84 controller confirms that the active catalyst layer is at or above the light-off temperature.

A number of occurrences in which the status of the oxidation catalyst 92 is determined to be quenched and hydrocarbon injection is stopped may be tracked and stored in memory of the controller, generally indicated by box 60. The number of tracked occurrences in which the status of the oxidation catalyst 92 is determined to be quenched and hydrocarbon injection is stopped may then be compared to a pre-defined limit to determine if the number of tracked occurrences is less than or equal to the pre-defined limit, generally indicated by box 62. The pre-defined limit represents the number of instances in which the vehicle 84 may attempt to regenerate the particulate filter 94 at the current acceleration rate. If the number of occurrences is less than the pre-defined limit, generally indicated at 64, then the vehicle 84 controller may maintain the current acceleration rate, generally indicated by box 66, and retry regeneration of the particulate filter 94. If the number of occurrences is equal to or greater than the pre-defined limit, generally indicated at 68, then the oxidation catalyst 92 may be degraded and may no longer be operating at one hundred percent (100%) efficiency, then the controller may decrease the acceleration rate at which the hydrocarbon injection rate is increased. It has been discovered that decreasing the acceleration rate may limit or prevent the oxidation catalyst 92 from becoming quenched.

Additionally, the current acceleration rate of hydrocarbon injection may be compared to a minimum allowable acceleration rate to determine if the current acceleration rate is greater than or equal to the minimum allowable acceleration rate, generally indicated by box 70. The minimum allowable acceleration rate is the slowest rate at which hydrocarbon injection may be increased. If the current acceleration rate is equal to the minimum allowable acceleration rate, generally indicated at 72, then the current acceleration rate may not be decreased and vehicle 84 diagnostics are engaged to determine the status of the oxidation catalyst 92, generally indicated by box 74. However, if the current acceleration rate is greater than the minimum allowable acceleration rate, generally indicated at 76, then the current acceleration rate may be decreased.

When the status of the oxidation catalyst 92 is determined to be quenched, the number of tracked occurrences is determined to be less than the pre-defined limit, and the current acceleration rate is determined to be greater than the minimum allowable acceleration rate, then the method further includes reducing the current acceleration rate to define a reduced acceleration rate when, generally indicated by box 78. As such, the current acceleration rate of hydrocarbon injection is re-defined to be equal to the reduced acceleration rate of hydrocarbon injection, generally indicated by box 80, and the re-defined current acceleration rate is stored in the memory of the controller. The method continues as described above, using the re-defined current acceleration rate to increase the hydrocarbon injection rate. If the oxidation catalyst 92 continues to be quenched, then the system continues to reduce the current acceleration rate of hydrocarbon injection to define a further reduced acceleration rate, and continues to re-define the current acceleration rate to be equal to the further reduced acceleration rate. This iterative process continues until the status of the oxidation catalyst 92 is determined to be not quenched.

While the best modes for carrying out the invention have been described in detail, those familiar with the art to which this invention relates will recognize various alternative designs and embodiments for practicing the invention within the scope of the appended claims.

The invention claimed is:

1. A method of controlling an exhaust gas treatment system for a vehicle, the method comprising:
   injecting hydrocarbons at an injection rate into a flow of exhaust gas upstream of an oxidation catalyst to heat the oxidation catalyst;
   increasing the injection rate at a current acceleration rate;
   sensing a status of the oxidation catalyst to determine if the oxidation catalyst is quenched or is not quenched;

reducing the current acceleration rate to define a reduced acceleration rate when the status of the oxidation catalyst is determined to be quenched; and re-defining the current acceleration rate of hydrocarbon injection to be equal to the reduced acceleration rate of hydrocarbon injection.

2. A method as set forth in claim 1 wherein sensing the status of the oxidation catalyst includes sensing a temperature of the exhaust gas upstream of the oxidation catalyst and downstream of the oxidation catalyst.

3. A method as set forth in claim 2 wherein sensing the status of the oxidation catalyst includes comparing the sensed downstream temperature of the exhaust gas with the sensed upstream temperature of the exhaust gas as the hydrocarbon injection rate increases to determine if the sensed downstream temperature is less than, equal to or greater than the upstream temperature as the hydrocarbon injection rate increases.

4. A method as set forth in claim 3 wherein sensing the status of the oxidation catalyst includes determining the oxidation catalyst is quenched when the downstream temperature of the exhaust gas is equal to or less than the upstream temperature of the exhaust gas as the hydrocarbon injection rate increases.

5. A method as set forth in claim 1 further comprising continuing to reduce the current acceleration rate of hydrocarbon injection to define the reduced acceleration rate, and continuing to re-define the current acceleration rate to be equal to the reduced acceleration rate until the status of the oxidation catalyst is determined to be not quenched.

6. A method as set forth in claim 1 further comprising storing the re-defined current acceleration rate in a memory of a controller.

7. A method as set forth in claim 1 further comprising stopping the injection of hydrocarbons when the status of the oxidation catalyst is determined to be quenched.

8. A method as set forth in claim 7 further comprising tracking a number of occurrences in which the status of the oxidation catalyst is determined to be quenched and hydrocarbon injection is stopped.

9. A method as set forth in claim 8 further comprising comparing the number of tracked occurrences to a pre-defined limit to determine if the number of tracked occurrences is less than or equal to the pre-defined limit.

10. A method as set forth in claim 9 wherein reducing the current acceleration rate to define a reduced acceleration rate when the status of the oxidation catalyst is determined to be quenched is further defined as reducing the current acceleration rate to define a reduced acceleration rate when the status of the oxidation catalyst is determined to be quenched and the number of tracked occurrences is determined to be less than the pre-defined limit.

11. A method as set forth in claim 1 further comprising comparing the current acceleration rate of hydrocarbon injection to a minimum allowable acceleration rate to determine if the current acceleration rate is greater than or equal to the minimum allowable acceleration rate.

12. A method as set forth in claim 11 wherein reducing the current acceleration rate to define a reduced acceleration rate when the status of the oxidation catalyst is determined to be quenched is further defined as reducing the current acceleration rate to define a reduced acceleration rate when the status of the oxidation catalyst is determined to be quenched and the current acceleration rate is determined to be greater than the minimum allowable acceleration rate.

13. A method as set forth in claim 1 further comprising detecting a request to regenerate a particulate filter.

14. A method as set forth in claim 1 further comprising defining the current acceleration rate of hydrocarbon injection.

15. A method as set forth in claim 1 wherein the current acceleration rate of hydrocarbon injection includes a linear acceleration rate.

16. A method as set forth in claim 1 wherein the current acceleration rate of hydrocarbon injection includes a non-linear acceleration rate.

17. A method of operating a vehicle having an exhaust gas treatment system, the method comprising:
    detecting a request to regenerate a particulate filter;
    defining a current acceleration rate of hydrocarbon injection;
    injecting hydrocarbons at an injection rate into a flow of exhaust gas upstream of an oxidation catalyst to heat the oxidation catalyst;
    increasing the injection rate at the current acceleration rate;
    sensing a status of the oxidation catalyst to determine if the oxidation catalyst is quenched or is not quenched;
    stopping the injection of hydrocarbons when the status of the oxidation catalyst is determined to be quenched;
    comparing the current acceleration rate of hydrocarbon injection to a minimum allowable acceleration rate to determine if the current acceleration rate is greater than or equal to the minimum allowable acceleration rate;
    tracking a number of occurrences in which the status of the oxidation catalyst is determined to be quenched and hydrocarbon injection is stopped;
    comparing a number of occurrences in which the status of the oxidation catalyst is determined to be quenched and hydrocarbon injection is stopped to a pre-defined limit to determine if the number of occurrences is less than or equal to the pre-defined limit; and
    reducing the current acceleration rate to define a reduced acceleration rate when the status of the oxidation catalyst is determined to be quenched, the number of occurrences is determined to be less than the pre-defined limit, and the current acceleration rate is determined to be greater than the minimum allowable acceleration rate.

18. A method as set forth in claim 17 wherein sensing the status of the oxidation catalyst includes comparing a temperature of the exhaust gas downstream of the oxidation catalyst with temperature of the exhaust gas upstream of the oxidation catalyst as the hydrocarbon injection rate increases to determine if the downstream temperature is less than, equal to or greater than the upstream temperature as the hydrocarbon injection rate increases.

19. A method as set forth in claim 18 wherein sensing the status of the oxidation catalyst includes determining the oxidation catalyst is quenched when the downstream temperature of the exhaust gas is equal to or less than the upstream temperature of the exhaust gas as the hydrocarbon injection rate increases, and determining the oxidation catalyst is not quenched when the downstream temperature of the exhaust gas is greater than the upstream temperature of the exhaust gas as the hydrocarbon injection rate increases.

* * * * *